United States Patent
Hiebl

(10) Patent No.: US 12,033,375 B2
(45) Date of Patent: Jul. 9, 2024

(54) FACIAL RECOGNITION USING NEURAL NETWORKS

(71) Applicant: Airbus Defence and Space GmbH, Taufkirchen (DE)

(72) Inventor: Manfred Hiebl, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 338 days.

(21) Appl. No.: 17/241,600

(22) Filed: Apr. 27, 2021

(65) Prior Publication Data

US 2021/0342576 A1    Nov. 4, 2021

(30) Foreign Application Priority Data

May 4, 2020 (DE) ...................... 10 2020 111 955.0

(51) Int. Cl.
| | |
|---|---|
| *G06V 10/82* | (2022.01) |
| *G06F 18/21* | (2023.01) |
| *G06V 10/70* | (2022.01) |
| *G06V 10/764* | (2022.01) |
| *G06V 40/16* | (2022.01) |

(52) U.S. Cl.
CPC .......... *G06V 10/82* (2022.01); *G06F 18/2163* (2023.01); *G06V 10/70* (2022.01); *G06V 10/764* (2022.01); *G06V 40/165* (2022.01); *G06V 40/172* (2022.01)

(58) Field of Classification Search
CPC ............................ G06V 10/82; G06F 18/2163
See application file for complete search history.

(56) References Cited

U.S. PATENT DOCUMENTS

| | | | |
|---|---|---|---|
| 8,626,686 B1* | 1/2014 | Rhodes ................ | G06V 10/454 |
| | | | 382/156 |
| 10,311,334 B1 | 6/2019 | Florez Choque et al. | |
| 10,805,556 B1* | 10/2020 | Sorgi ...................... | G06F 18/00 |
| 2002/0168100 A1* | 11/2002 | Woodall .................... | G06T 7/20 |
| | | | 382/156 |
| 2018/0353042 A1* | 12/2018 | Gil ......................... | A47L 9/2826 |
| 2019/0294889 A1* | 9/2019 | Sriram .............. | G06F 18/24143 |
| 2020/0021733 A1* | 1/2020 | Liu ....................... | H04N 23/635 |

(Continued)

FOREIGN PATENT DOCUMENTS

DE    69911780 T2    7/2004

OTHER PUBLICATIONS

"Polygon Mesh", cited in Wikipedia, The Free Encyclopedia, Processing status: Mar. 29, 2020, 11:21 UTC. URL: https://en.wikipedia.org/w/index.php?title=Polygon_mesh&oldid=947958119 [accessed on Mar. 9, 2021].

(Continued)

*Primary Examiner* — Kevin Ky
(74) *Attorney, Agent, or Firm* — Lerner David LLP

(57) ABSTRACT

An object identification unit contains an artificial neural network and is designed to identify human faces. For this purpose, a face is divided into a number of triangles. The relative component of the area of each triangle in the total of the areas of all triangles is ascertained to ascertain a rotational angle of the face. The relative component of the area of each triangle in the total of the area of all triangles is then scaled to a rotation-invariant dimension of the face. The scaled area of the triangles is supplied to the artificial neural network in order to identify a person.

8 Claims, 4 Drawing Sheets

(56) References Cited

U.S. PATENT DOCUMENTS

| | | | |
|---|---|---|---|
| 2020/0043192 A1* | 2/2020 | Zhang | G06V 20/64 |
| 2020/0167893 A1* | 5/2020 | Gupta | G06V 40/172 |
| 2020/0302612 A1* | 9/2020 | Marrero | G06T 7/12 |
| 2020/0311903 A1* | 10/2020 | Tsutsumi | G16H 20/60 |
| 2021/0295594 A1* | 9/2021 | Sinha | G06V 20/64 |
| 2021/0342576 A1* | 11/2021 | Hiebl | G06V 40/172 |
| 2023/0177699 A1* | 6/2023 | Ray | G06T 7/12 |
| | | | 382/173 |
| 2023/0204424 A1* | 6/2023 | Ranganathan | G06V 20/17 |
| | | | 348/144 |

OTHER PUBLICATIONS

Osman Ali AS, Asirvadam VS, Malik AS, Eltoukhy MM, Aziz A. Age-invariant face recognition using triangle geometric features. International Journal of Pattern Recognition and Artificial Intelligence. May 26, 2015;29(05):1556006.

Extended European Search Report including Written Opinion for EP21171300.3 issued Sep. 15, 2021; 7 pages.

\* cited by examiner

FACIAL RECOGNITION USING NEURAL NETWORKS

FIELD OF THE INVENTION

The present description relates to an object identification unit for identifying objects and a corresponding method for identifying objects using an artificial neural network. The object identification unit uses an artificial neural network to recognize objects with a high level of reliability even if the objects are rotated relative to an image acquisition unit.

BACKGROUND OF THE INVENTION

Artificial neural networks can be used to classify and/or identify objects. The face of a person assumes a key role for identifying a person. Identifying a person includes in particular assigning a face to a specific person.

In order that an artificial neural network can identify a person, the artificial neural network has to have been trained using an image of this person. This takes place in the so-called training phase. The artificial neural network is then capable of comparing an image to be identified of a person to all trained persons and to present the person who is closest to the image to be identified.

Certain specifications or requirements can be placed on the image of a person which is used for the identification process. One example of this are the so-called biometric images, on which the face of a person has to fill up a specific region (requirement for the dimension of the face on the image) and also has to be acquired from a predetermined viewing angle range (requirement for the perspective).

BRIEF SUMMARY OF THE INVENTION

An aspect relates to improving the reliability of the identification of persons using an artificial neural network.

According to one aspect, an object identification unit is specified for identifying objects. The object identification unit comprises an artificial neural network, ANN. The ANN contains an input layer and an output layer, wherein the ANN is designed to identify objects based on inputs at the input layer, wherein the input layer includes a plurality of input neurons, and wherein the input layer is designed to obtain an input vector, wherein the input vector contains items of object identification information on the object to be identified. The ANN is designed to identify an object based on the items of object identification information, wherein the items of object identification information correspond to a two-dimensional image of the object to be identified. The object identification unit is configured to divide the two-dimensional image into a plurality of triangles, which are delimited by characteristic points of the object to be identified at their corners. The object identification unit is configured to ascertain a rotational angle of the object to be identified in the two-dimensional image from symmetry properties of the object to be identified and relative area components of the individual triangles in the total sum of the area of the triangles and to multiply the areas of the individual triangles by a correction factor in order to obtain corrected areas of the triangles, which correspond to a symmetry condition or fulfill the symmetry condition. The object identification unit is configured to scale the corrected areas of the triangles to a rotation-invariant dimension of the object to be identified and to supply the scaled areas of the triangles to the ANN as an input vector.

The object identification unit described here can be used for identifying various objects, in particular those objects which are symmetrical with respect to an axis of symmetry. These objects can be faces of humans, images of animals and plants or of machines. The object identification unit is described hereinafter in conjunction with recognizing faces or identifying persons. However, it is to be understood that this is solely an application example and the general validity of the use of the object identification unit for identifying arbitrary objects is not restricted by the reference to a human face.

One challenge in identifying persons is when the face of a person on a photographic image from an image acquisition unit, for example a camera for moving or unmoving images, is rotated, i.e., the face was not acquired frontally. Such a rotation of the face makes the automated machine recognition of the face more difficult, in particular if the comparison images of the persons were acquired frontally or at a viewing angle which differs from the viewing angle of the image to be identified.

The object identification unit described here meets this challenge in that sections of an image of a face to be identified are firstly provided with a correction factor in order to compensate for the deviation of the dimensions of the face caused by the rotation. The sections of the image of the face to be identified are then scaled in order to compensate for dimension differences in the images to be compared. In particular, the relative component of the area of each triangle in the total of the areas of all triangles is ascertained in order to ascertain a rotational angle of the face. The relative component of the area of each triangle in the total of the areas of all triangles is then scaled to a rotation-invariant dimension of the face. The scaled area of the triangles is supplied to the artificial neural network in order to identify a person.

In particular, it is provided that an image of a face is divided into multiple triangles, wherein each triangle is defined by three characteristic points in the image of the face. At least some of these triangles are placed in the image of the face so that each two triangles are located axially symmetrically with respect to a vertical or horizontal axis of the face. This arrangement of the triangles is based on the concept that a face is symmetrical with respect to a vertical centre axis. It is accordingly presumed that triangles in the two halves of the face which are defined by the same characteristic points or characteristic points corresponding to one another are of equal size. This is referred to in the present case as the symmetry property or symmetry condition. If this symmetry condition is not met, it can be presumed that the face is rotated on the image. However, this rotation can be compensated for on the basis of the known symmetry property of a human face in that areas or dimensions of symmetrical triangles are related to one another.

The areas of two triangles which are arranged symmetrically with respect to a centre axis of the face can be used to form a quotient. This quotient states by how much the areas of these triangles differ from one another. In the case of an object which is symmetrical per se, such as a human face, the areas would have to be equal in size and the quotient would be 1. However, if the face is rotated, the quotient assumes a different value. The correction factor to be applied is thus dimensioned so that the area of a triangle represented in corrupted form in the image is corrected to its actual value or its actual component in the total area of the face (this relates here to the relative component of a triangle in the total of the areas of all triangles into which a face was divided). A rotation of the face is compensated for by this approach, which facilitates automated machine recognition by means of an artificial neural network.

In a further step, the area of the triangles corrected in this way is scaled to a rotation-invariant dimension of the face. For example, a horizontal or vertical distance between two points in the face can be used as the rotation-invariant dimension, which does not change upon a rotation of the face. For example, the vertical distance between the height of the eyes and the centre of the upper lip does not change if the head is rotated around the vertical axis. Other vertical distances in the face also do not change if the head is solely rotated around the vertical axis. Therefore, those dimensions which are independent of a rotation can be used to scale the areas of the triangles.

It is thus provided that a two-step correction of an image of a face is to be executed in order to make the identification of a person using an artificial neural network more reliable: first, the face is divided into triangles which are delimited by characteristic points, and this is done so that at least some of the triangles are axially symmetrical with respect to an axis of the face. The triangles axially symmetrical to one another are of equal size in an image of the face without rotation. If this symmetry condition does not apply in an image, it results that the face is rotated. A correction factor can be ascertained from the dimension ratio of triangles axially symmetrical to one another, with the aid of which the relative component of the area of a triangle in the total of the areas of all triangles can be ascertained, specifically for the case that the face is not rotated. In a second step, the corrected areas of the triangles are scaled to a rotation-invariant dimension in the face. A corrected and scaled image of a face is created by this approach, so that the rotation is compensated for the face and it is brought into a common image plane with the trained images of faces.

In principle, the ANN is constructed from an input layer, one or more intermediate layers, and an output layer. It is conceivable that the ANN is a two-layer ANN without concealed layer. Each layer contains a plurality of neurons, wherein each neuron of one layer is connected to all neurons of the next layer. An ANN can be trained using a large number of input data and thus configured so that it recognizes objects which have been learned once and supplies a corresponding output value. In the present case, the ANN is trained using images of faces, which are imaged frontally and in which the facial dimension is established. These faces are also divided into a plurality of triangles, so that the areas of the triangles, the relative component of the area of each triangle in the total sum of the areas of the triangles, and the scaling of the areas of the triangles to a rotation-invariant dimension of the face are used by the ANN as identification parameters.

The artificial neural network can be executed on a computer or a computer network, wherein the computer or the computer network (then by means of parallel processing of the instructions) can execute the ANN in various configurations. For example, the ANN can be executed on a computer, a field programmable gate array (FPGA), or a processor. If the ANN is executed in various configurations, this does not necessarily change anything in the hardware on which the ANN is executed. Rather, for example, the configuration of the individual neurons and/or the weighting of the information transfer between neurons of various layers changes.

The ANN is designed, for example, to assume a plurality of different configurations, wherein each configuration of the ANN corresponds to a trained person and wherein the ANN supplies a specific input vector of multiple configurations from the plurality of various configurations. In particular, the information of the individual configurations is contained in the weights of the individual neurons and represents a minimum on a multidimensional hypersurface. This minimum represents the minimum deviation between a face to be identified and one or more faces compared thereto. In the case of very similar faces, as can be the case with twins, for example, confusions can occur however (also referred to as a "false positive"). The similarity of the image to be identified to various faces known to the ANN can thus be ascertained. The face having the greatest similarity (or the least dissimilarity) is then output by the ANN as the result of the identification procedure.

Each configuration of the ANN corresponds to a person and is designed so that the ANN recognizes this person, and does so under various perspectives on the face of the person and at varying distances of the person from the acquiring image acquisition unit.

In one embodiment, the rotation-invariant dimension is a vertical or horizontal distance between two characteristic points of the object to be identified.

Depending on the rotation of the face in the image, either horizontal distances or vertical distances between unchanging points are not influenced by the rotation. In the present case, both horizontal and also vertical distances can be used as the rotation-invariant dimension.

In a further embodiment, the object identification unit is configured to be trained in a training phase using a plurality of images of objects, wherein the images show the objects without rotational angles.

By way of the above-described approach, it is possible to compare the image of a rotated face using an artificial neural network to those images of faces which were recorded frontally and without rotation of the face.

In a further embodiment, the symmetry condition is an axial symmetry with respect to an axis of the object to be identified.

The approach described here can preferably be used for those objects which have at least one axis of symmetry. The human face, for example, is generally symmetrical with respect to a vertical centre axis. This symmetry property permits rotations of the face around a vertical axis to be recognized, because the areas of triangles on the left half of the face differ from the areas of corresponding triangles on the right half of the face (or vice versa), although they would have to be identical due to the symmetry property.

For objects which are axially symmetrical with respect to a horizontal axis, the same statement applies for the upper and the lower half of the image of the object. A rotation of the object around the transverse axis can be compensated for in this case. A missile or guided missile can be mentioned as an example of this application, which is observed from the side and in which the elevator is not engaged.

In a further embodiment, the object identification unit is configured to divide the two-dimensional image into a plurality of triangles so that at least some of the triangles are symmetrical with respect to an axis of the object to be identified.

A completely symmetrical division is preferably performed. This may be helpful and advantageous. However, it is also possible to execute an identification without a complete symmetrical division of the object in that the symmetrical triangles are used.

In a further embodiment, the object identification unit is embodied to ascertain the correction factor in that a dimension ratio is ascertained for each pair of triangles consisting of two triangles corresponding to one another.

A virtual image is created or triangle dimensions of the image are created without rotational angles.

According to a further aspect, a method is specified for identifying objects using an artificial neural network, ANN. The method includes the following steps: dividing a two-dimensional image of an object to be identified into a plurality of triangles which are delimited by characteristic points of the object to be identified at their corners; ascertaining a rotational angle of the object to be identified in the two-dimensional image based on symmetry properties of the object to be identified and relative area components of the individual triangles in a total sum of the area of the triangles; ascertaining corrected areas of the triangles in that the areas of the triangles are multiplied by a correction factor, wherein the corrected areas of the triangles correspond to a symmetry condition; scaling the corrected areas of the triangles to a rotation-invariant dimension of the object to be identified; and supplying the scaled corrected areas to the ANN, in order to carry out a comparison of objects based thereon and to identify these objects.

The same statements as are described above or below with reference to the object identification unit apply to the method. To avoid unnecessary repetition, the functional features of the object identification unit are not reproduced at this point. In any case, the functional features of the object identification unit can be implemented as method steps and vice versa. Some of the functional features are specified by way of example here as method steps, which is not to be understood as a restriction, however, in such a way that other functional features cannot be implemented as method steps.

In one embodiment of the method, the rotation-invariant dimension is a vertical or horizontal distance between two characteristic points of the object to be identified.

A horizontal distance upon a rotation of the object/face around the vertical axis is only rotation-invariant after a correction of the rotational angle around the vertical axis, however. Expressed in general terms, a vertical distance is rotation-invariant with respect to rotations around the vertical axis and a horizontal distance is rotation-invariant with respect to rotations around the transverse axis.

In a further embodiment, the symmetry condition is an axial symmetry with respect to an axis of the object to be identified.

BRIEF DESCRIPTION OF THE DRAWINGS

Exemplary embodiments are described in greater detail hereinafter on the basis of the appended drawings. The illustrations are schematic and are not to scale. Identical reference signs relate to identical or similar elements. In the figures.

DETAILED DESCRIPTION

Figure 1:
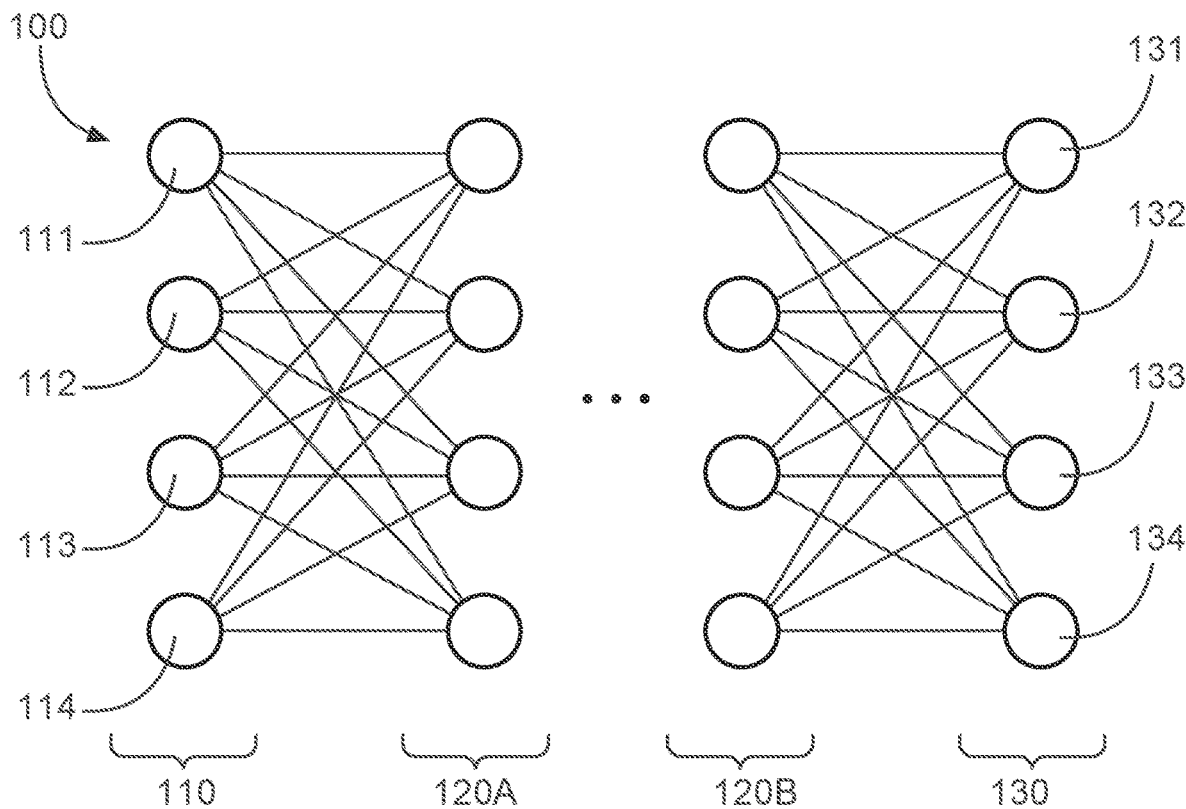
FIG. 1 shows a schematic illustration of an artificial neural network for an object identification unit for identifying objects.

FIG. 1 shows a schematic illustration of an artificial neural network, ANN, 100. The ANN 100 includes an input layer 110 having multiple input neurons 111 to 114. For example, the input layer 110 contains a number of input neurons at which identification parameters of a face are transmitted. The corrected and scaled triangle areas are used as identification parameters, as described above. The ANN can be equipped without intermediate layer or with one or more intermediate layers. In the present case, two intermediate layers 120A and 120B are shown. Furthermore, the ANN 100 contains an output layer 130 having output neurons 131 to 134.

It is a characteristic feature of the ANN that each neuron of a layer is connected to all neurons of the following layers (located farther to the right in the illustration of FIG. 1). In a training phase, object identification data are supplied to the input layer of the ANN and the ANN is trained to recognize the supplied object identification data of all objects and assign them to the respective persons. The object identification data are contained in the weights of the ANN and are expressed as minima on a multidimensional hypersurface, wherein each of the trained reference images corresponds to precisely one (main) minimum. During the identification, one of these minima is activated by back propagation, specifically the face of the person sought or to be identified. Based on this training, the neurons are networked so that they also recognize an object learned once in other object identification data and supply a corresponding output value at the output layer 130.

Figure 2:
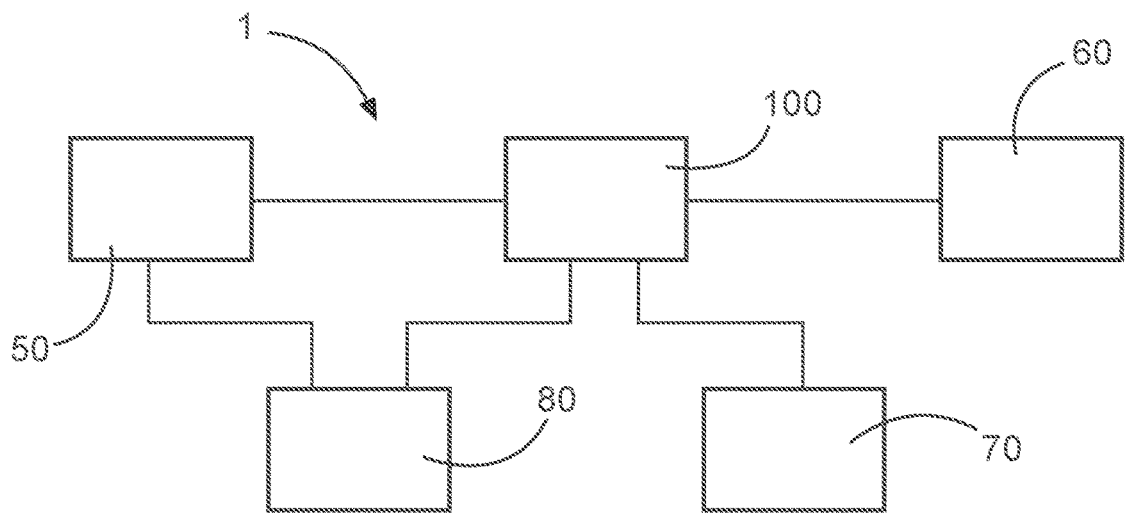
FIG. 2 shows a schematic illustration of an object identification unit.

FIG. 2 shows an object identification unit 1 having a data source 50, an artificial neural network 100, as shown in FIG. 1, for example, an output unit 60, a data memory 70, and a control unit 80.

The data source 50 supplies images of one or more faces to the ANN 100, where the images are subjected to an identification procedure. The data source 50 can be, for example, a camera or a data memory, in which images are stored and can be output to the ANN 100. The data source 50 can be connected to the ANN 100 directly or via a data transmission network. The transmission of the images from the data source 50 to the ANN 100 can be initiated or controlled by the control unit 80.

The ANN 100 can access a data memory 70. For example, the parameters of various configurations of the ANN 100 can be stored in the data memory 70. The weightings for the individual neurons can be loaded with the aid of these configurations to compare an image of one person to the image of all trained persons. The result of the identification procedure is transmitted by the ANN 100 to the output unit 60.

Figure 3:
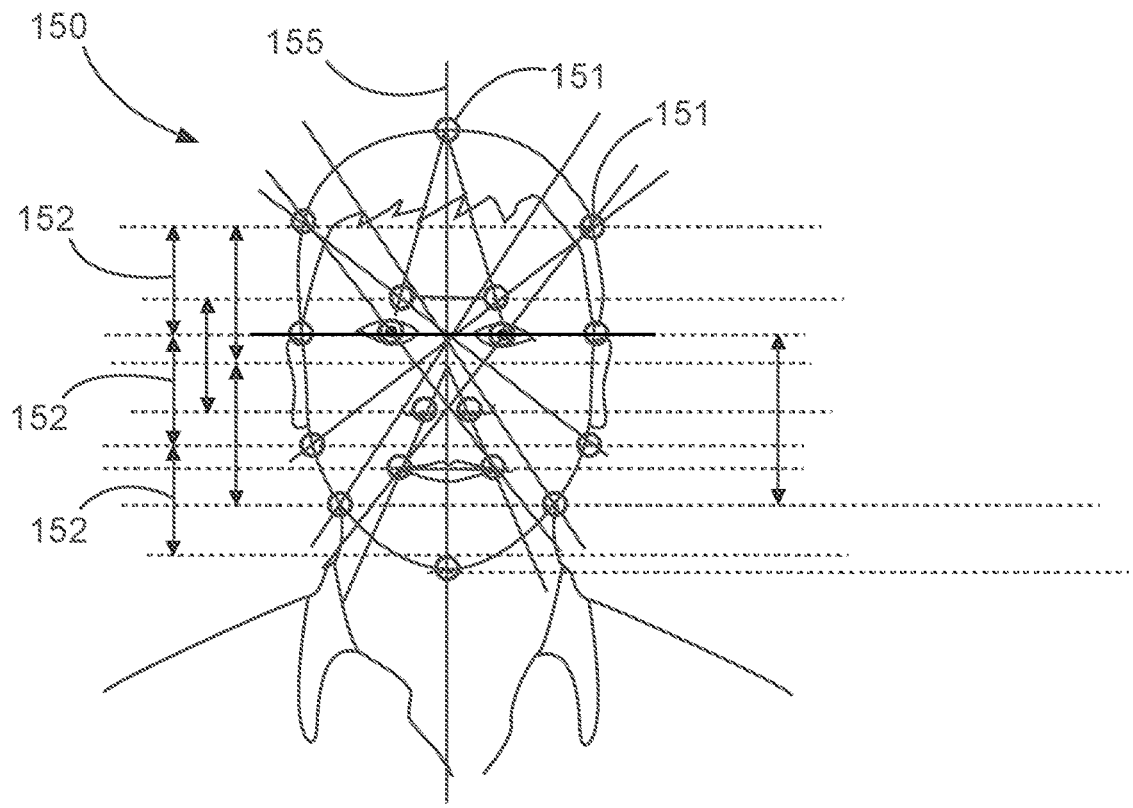
FIG. 3 shows a schematic illustration of a human face having characteristic points and triangles thus defined.

FIG. 3 shows by way of example the definition of characteristic points in a human face. The characteristic points are each identified by a circle 151. Some of these circles 151 are connected to one another via lines, so that these define line triangles, of which some can be used for the identification of a person. Furthermore, some vertical distances 152 are shown in FIG. 3. If the face in FIG. 3 is rotated around the vertical axis 155, the vertical distances 152 thus do not change.

Figure 4:
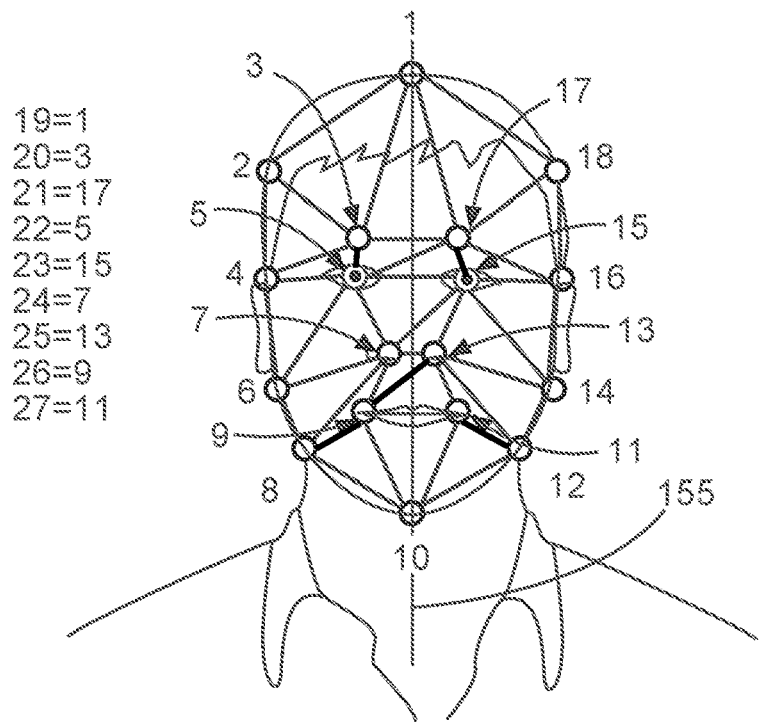
FIG. 4 shows a division of the face from FIG. 3 into a plurality of triangles.

FIG. 4 shows the face from FIG. 3 with highlighted triangles and numbered corner points of these triangles. The selection and definition of the triangles in FIG. 4 is to be understood solely as an example. Triangles can be laid in a different way and in a different number in the face or the image of the face.

It can be seen from FIG. 4 that some of the triangles are symmetrical to one another in both halves of the face with respect to the vertical centre axis 155 of the face. Thus, for example, the triangle defined by the points 2, 3, 4 is an axial reflection of the triangle defined by the points 16, 17, 18 (these two triangles reflected at the centre axis are referred to as triangles corresponding to one another). Similar symmetry properties are also found in other triangles. Triangles corresponding to one another are characterized by identical shape and area (i.e., these triangles are mapped on one another by a rotation around 180°) and are found in many or even most human faces.

In the case of a face rotated around the vertical axis, the areas of triangles corresponding to one another are not identical in a two-dimensional image of the rotated face. For example, if the face in FIG. 4 is rotated slightly to the left, the area of this triangle 16, 17, 18 becomes smaller than the area of the triangle 2, 3, 4. The ratio of these two areas can be used to determine the rotational angle of the face. To increase the reliability or accuracy of the determination of the rotational angle of the face, multiple or all triangles corresponding to one another of the two halves of the face can be used and compared to one another in their dimension. The absolute area of the triangles is preferably not used in this case, but rather the component of the area of a triangle in the total of the area of all triangles, which are laid in the human face.

The approach for identifying persons is described by way of example at this point with reference to FIG. 3 and FIG. 4.

Firstly, the face is decomposed into a finite number of elementary basic triangles, the corner points of which are in a distance ratio to one another singular for each human. The idea of a facial recognition is based on the concept that there are no two identical faces with the exception of identical twins. If we compare two faces to one another, we establish that humans have noses of different lengths, different distances between the eyes, or different widths of the mouth. These features are referred to as biometric data. FIG. 3 and FIG. 4 provide one example of this.

Thus, lines can be drawn through the face, for example on the basis of noteworthy points such as centre of the eyes and nose, chin tip, etc. or characteristic dimensions such as distance between the ears, length of nose or upper lip, which result in a biometric profile of a human and thus represent an invariable physical feature. If one uses a characteristic dimension, such as the distance of the eye line (horizontal line which connects the eyes to one another) to the nose line (horizontal line which connects the nostrils to one another) as a scaling dimension, all humans will differ in at least one, but extremely probably in multiple, possibly even many features from the reference person.

If we now select a finite number of characteristic points in the face (circles 151 in FIG. 3), triangular areas may thus be formed from each three points, which have a uniquely defined surface normal. The representation of a face is nothing more than the projection of a spatially curved surface in the image plane, wherein the angle lies between the three-dimensional surface normals A and the surface normals of the projected surface $A_n$. Each area element on a photo is thus smaller by the cosine of the angle which the normal vector assumes on the three-dimensional facial surface with the vertical line perpendicular to the image plane than the actual surface of the three-dimensional face.

Since a human face is curved multiple times and in different ways, it is first decomposed into a sufficient number of area elements. The arrangement shown in FIG. 4 made up of 25 triangles, which adjoin one another seamlessly, is selected as a decomposition of the facial area without restriction of the generality.

In this case, each of the total of 27 corner points is at least once the starting or end point of one of the 25 triangular areas $A_{i+1,i+2}$, which can be arranged in rising sequence as follows $A_{123}, A_{234}, A_{345}, \ldots, A_{i,i+1,i+2}, \ldots, A_{m,m+1,m+2}$ To thus be able to decompose an area into m triangles, m+2 corner points are required. In the present case, m=25. With respect to the decomposition, it is also preferable to select it so that a progressive series of points results, in which as much as possible none is omitted or is not a corner point of a basic triangle. Double counts are expressly permitted, possibly even unavoidable. FIG. 4 shows a decomposition with 18 corner points and 9 further points, which were assigned twice and are listed on the left of the face.

All partial triangles of the image plane are added together according to the following formula to form a total area $$A = \sum_{j=1}^{m} A_{j,j+1,j+2},$$

The total area is used as a reference variable because the neurons are handled for comparative purposes as values less than or equal to 1. The following expression then applies for the scaled triangular areas $$a_{j,j+1,j+2} = \frac{A_{j,j+1,j+2}}{A}.$$

To calculate a triangular area in three-dimensional space, we require the surface normals, which may be represented as a cross product of the two distance vectors $\Delta r_{ij}$ and $\Delta r_i$ from a common corner point i to each of the two other corner points j and k in the triangle, i.e.

$$A_{ijk} = \frac{1}{2}\Delta r_{ij} \times \Delta r_{ik} = \frac{1}{2}\begin{pmatrix}\Delta x_{ij}\\\Delta y_{ij}\\\Delta z_{ij}\end{pmatrix} \times \begin{pmatrix}\Delta x_{ik}\\\Delta y_{ik}\\\Delta z_{ik}\end{pmatrix} = \frac{1}{2}\begin{pmatrix}\Delta y_{ij}\Delta z_{ik} - \Delta z_{ij}\Delta y_{ik}\\\Delta z_{ij}\Delta x_{ik} - \Delta x_{ij}\Delta z_{ik}\\\Delta x_{ij}\Delta y_{ik} - \Delta y_{ij}\Delta x_{ik}\end{pmatrix}.$$

Figure 5:
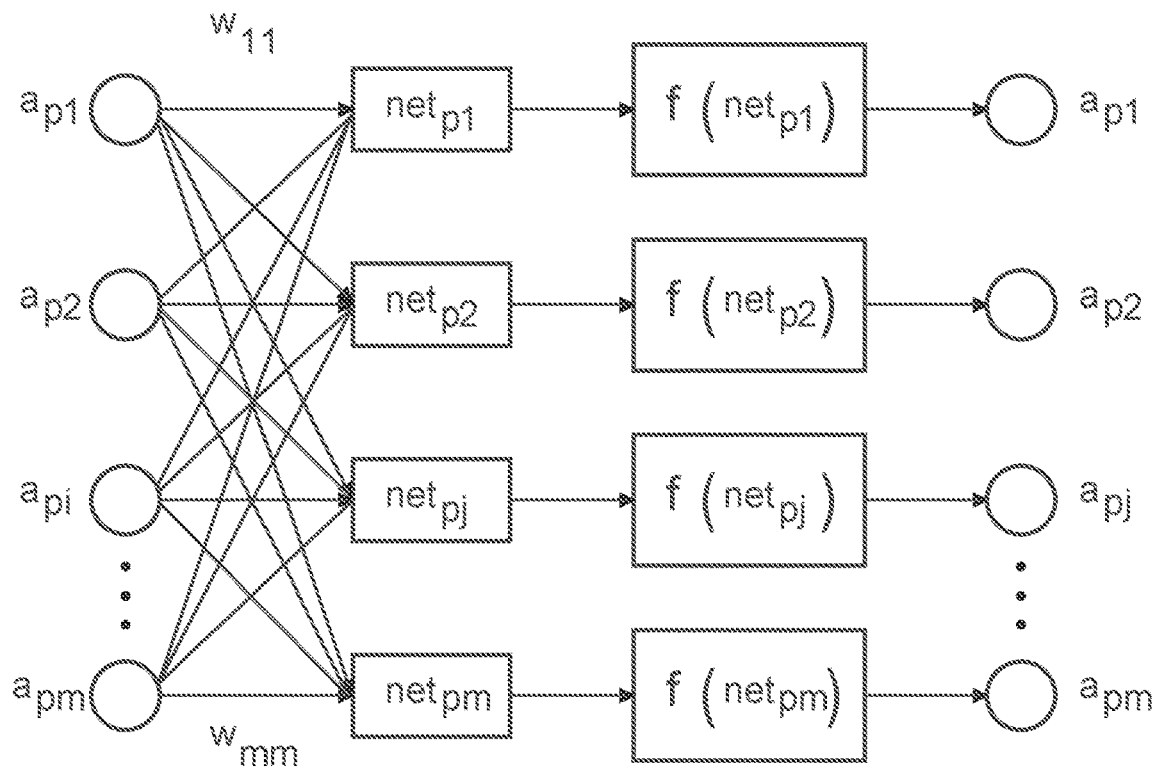
FIG. 5 shows a schematic illustration of an artificial neural network.

For plane vectors in the x-y plane, only the z component remains of this vector.

$$A_{ijk} = \frac{1}{2}|\Delta r_{ij} \times \Delta r_{ik}| = \frac{1}{2}\left|\begin{pmatrix}\Delta x_{ij}\\\Delta y_{ij}\\0\end{pmatrix} \times \begin{pmatrix}\Delta x_{ik}\\\Delta y_{ik}\\0\end{pmatrix}\right| = \frac{1}{2}|\Delta x_{ij}\Delta y_{ik} - \Delta y_{ij}\Delta x_{ik}|,$$

wherein absolute value bars are placed since areas can also be negative. In detail, the following relations apply for the respective distance differences $\Delta x_{ij}=x_j-x_i, \Delta x_{ik}=x_k-x_i,$ $\Delta y_{ij}=y_j-y_i, \Delta y_{ik}=y_k-y_i,$ $\Delta z_{ij}=z_j-z_i, \Delta z_{ik}=z_k-z_i.$ To take into consideration a large number of possible faces, we additionally introduce a training pattern with the index p for each individual face, which is schematically shown in FIG. 5.

To save running indices, we first define the output neurons $\alpha_{pj}$ and the target output values $\hat{\alpha}_{pj}$ by $$a_{pi} \equiv a_{p,j,j+1,j+2} = \frac{A_{p,j,j+1,j+2}}{A_p} = \frac{|\Delta x_{p,j,j+1}\Delta y_{p,j,j+2} - \Delta y_{p,j,j+1}\Delta x_{p,j,j+2}|}{\sum_{j=1}^{m} A_{p,j,j+1,j+2}},$$

$$\hat{a}_{pi} \equiv \hat{a}_{p,j,j+1,j+2} = \frac{\hat{A}_{p,j,j+1,j+2}}{\hat{A}_p} = \frac{|\Delta \hat{x}_{p,j,j+1}\Delta \hat{y}_{p,j,j+2} - \Delta \hat{y}_{p,j,j+1}\Delta \hat{x}_{p,j,j+2}|}{\sum_{j=1}^{m} \hat{A}_{p,j,j+1,j+2}}$$

for j=1, 2, ..., m. In the two-layer network from FIG. 5, the following thus applies $\alpha_{pi}$ the input of the neuron i in the input layer, wherein $1 \leq i \leq m$, $\alpha_{pj}$ the output of the neuron j in the output layer, wherein $1 \leq j \leq m$, $net_{pj}$ the net input of the neuron j in the output layer from layer 1, wherein $1 \leq j \leq m$, $w_{ij}$ the connecting weight from neuron i to j at the interface.

After the network has been taught using a large number of faces (FIG. 4 gives an example of a face supplied or taught in the network), it can be applied to other specific cases.

$$a_{pi} = \frac{A_{pj}^\perp}{A_p^\perp} \begin{cases} \frac{A_{pj}\cos(\theta_{pj} - \theta_p)}{\sum_{j=1}^{m} A_{pj}^\perp} & \text{for } j \in \{1, 2, 3, 4, 5, 6, 7, 8\}, \\ \frac{A_{pj}\cos\theta_{pj}}{\sum_{j=1}^{m} A_{pj}^\perp} & \text{for } j \in \{9, 19, 20, 21, 22, 23, 24, 25\}, \\ \frac{A_{pj}\cos(\theta_{pj} + \theta_p)}{\sum_{j=1}^{m} A_{pj}^\perp} & \text{for } j \in \{10, 11, 12, 13, 14, 15, 16, 17\}, \end{cases}$$

wherein $A_{p,18}^\perp = 0$. To explicitly differentiate from the three-dimensional surface elements, we have identified the two-dimensional projections with $A_{pj}^\perp$ instead of $A_{pj}$. Furthermore $$\hat{a}_{pi} = \frac{\hat{A}_{pj}^\perp}{\hat{A}_p^\perp} \frac{\hat{A}_{pj}\cos\theta_{pj}}{\sum_{j=1}^{m} \hat{A}_{pj}^\perp}$$

with $\hat{A}_{p,18}^\perp = 0$ and $\hat{A}_{pj}^\perp$ instead of $\hat{A}_{pj}$ applies.

Figure 6:
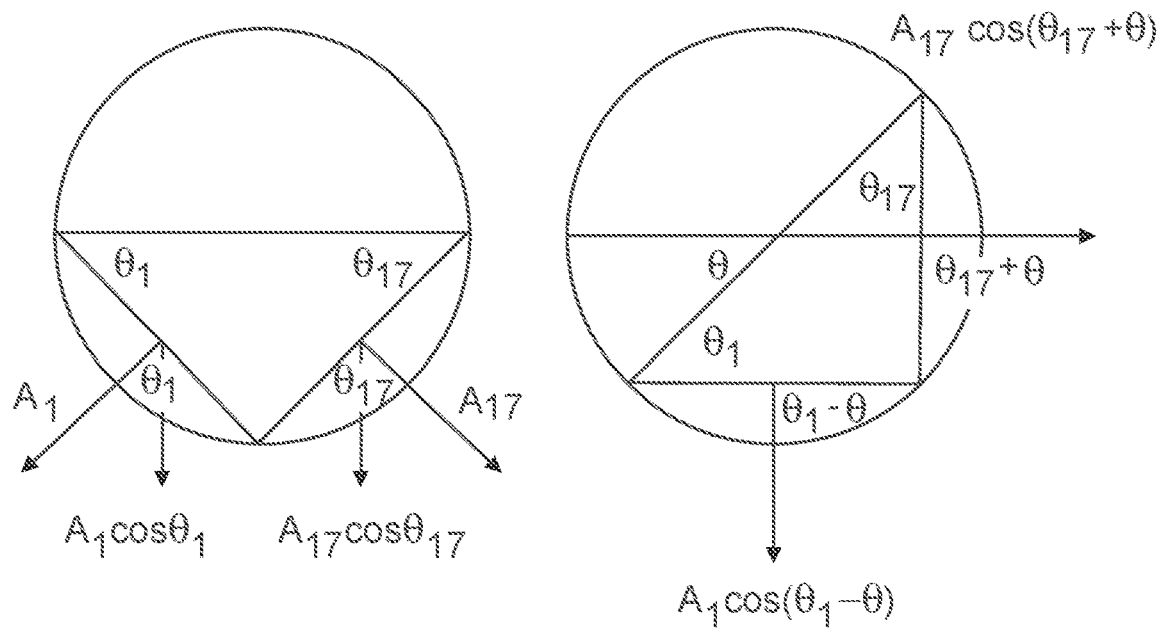
FIG. 6 shows a schematic illustration of the rotation of an image of a human face.

FIG. 6 illustrates on the basis of the example of two area elements 1 and 17 how the effects of a head rotation around the vertical axis may be compensated for. The left half image has complete symmetry for the angle $\Theta=0$, whereas the head rotation in the right half image results in area triangles of different sizes on the right and left of the vertical axis of symmetry of the face. Upon a rotation to the left of the head, the projection angle $\Theta_j$ of the surface normals and the rotational angle $\Theta$ have to be subtracted from one another, since the triangle areas face toward the observer and are on the right of the axis of symmetry. In contrast, if they are on the left of the axis of symmetry, they have to be added. The head rotation of the target images can therefore be eliminated by computation by averaging of associated area elements on the right and left of the middle of the face. In turn, areas which do not have a counterpart remain un-averaged, wherein this only occurs if a face was not divided completely into triangles symmetrical to one another. In FIG. 6, the geometry of the head movement is shown in the horizontal projection from above, i.e., with the face downward. The method is described hereinafter.

For this purpose, the index p is omitted hereinafter, because only a single image is observed. For $j \in \{1, 2, 3, 4, 5, 6, 7, 8\}$, the following applies in the case of the biometric horizontal projection ($\Theta=0$) for the reference areas $$\hat{a}_j = \hat{a}_{18-j} = \frac{\hat{A}_j^\perp + \hat{A}_{18-j}^\perp}{2\hat{A}^\perp} = \frac{\hat{A}_j\cos\theta_j + \hat{A}_{18-j}\cos\theta_{18-j}}{2\hat{A}^\perp} = \frac{\hat{A}_j\cos\theta_j}{\hat{A}^\perp}$$

Or $$\hat{a}_j = \frac{\hat{A}_j^\perp}{\hat{A}^\perp} = \frac{\hat{A}_j\cos\theta_j}{\hat{A}^\perp} \text{ for } j \in \{9, 18, 19, 20, 21, 22, 23, 24, 25\}.$$

for $j \in \{9,18,19,20,21,22,23,24,25\}$

Because it can be presumed that, as shown in FIG. 6, $\Theta_j = \Theta_{18-j}$ and $A_j = A_{18-j}$, the symmetrical areas for $j \in \{1,2,3,4,5,6,7,8\}$ can be averaged in the general case of a slightly oblique view, i.e.

$$a_j = a_{18-j} =$$
$$\frac{A_j^\perp + A_{18-j}^\perp}{2A^\perp} = \frac{A_j\cos(\theta_j - \theta) + A_{18-j}\cos(\theta_{18-j} + \theta)}{2A^\perp} = \frac{A_j\cos\theta_j\cos\theta}{A^\perp}.$$

for $j \in \{9,18,19,20,21,22,23,24,25\}$

For the asymmetrical areas, the following instead applies $$a_j = \frac{A_j^\perp}{A^\perp} = \frac{A_j\cos\theta_j\cos\theta}{A^\perp} \text{ for } j \in \{9, 18, 19, 20, 21, 22, 23, 24, 25\}.$$

If both equations are divided through one another, relations are obtained from which the rotational angle $\Theta$ can be determined, $$\cos\theta = \frac{A_j^\perp + A_{18-j}^\perp}{\hat{A}_j^\perp + \hat{A}_{18-j}^\perp} \frac{\hat{A}_j}{A_j} \text{ for } j \in \{1, 2, 3, 4, 5, 6, 7, 8\},$$

$$\cos\theta = \frac{A_j^\perp}{\hat{A}_j^\perp} \frac{\hat{A}_j}{A_j} \text{ for } j \in \{9, 18, 19, 20, 21, 22, 23, 24, 25\}.$$

For scaled facial areas, $\hat{A}_j = A_j$ etc. The angles can thus be calculated directly by means $$\cos\theta = \frac{a_j A^\perp}{a_j \hat{A}^\perp} = \frac{A_j^\perp + A_{18-j}^\perp}{\hat{A}_j^\perp + \hat{A}_{18-j}^\perp} \text{ or } \cos\theta = \frac{A_j^\perp}{\hat{A}_j^\perp}$$

To scale the images, the distance is used $$jh_0 = \left|\frac{\hat{r}_{15} + \hat{r}_5}{2} - \frac{\hat{r}_{13} + \hat{r}_7}{2}\right| = \frac{1}{2}\sqrt{(\hat{x}_{15} + \hat{x}_5 - \hat{x}_{13} - \hat{x}_7)^2 + (\hat{y}_{15} + \hat{y}_5 - \hat{y}_{13} - \hat{y}_7)^2}$$

between middle of eyes and middle of nose from the reference image. In the actual presented target image, this distance reads, for example $$h = \left|\frac{r_{15} + r_5}{2} - \frac{r_{13} + r_7}{2}\right| = \frac{1}{2}\sqrt{(x_{15} + x_5 - x_{13} - x_7)^2 + (y_{15} + y_5 - y_{13} - y_7)^2}.$$

To now scale an actual image to be evaluated, all position data have to be multiplied by the factor x=$h_0$/h, i.e., κ<1 if h≥ $h_0$ and ≥1 if h<$h_0$.

Thus, for example, for a comparison person, a κ of 0.7173 results and thus a corrected error of E=0.0012898, while the κ of another image is equal to 1.0139 and thus corresponds to an error of E=0.0018017. The image having the higher error thus differs from the comparison person by 39.7%, which enables a clear differentiation. The training algorithm is also described hereinafter.

The starting point for deriving a back propagation algorithm is the minimization rule of the learning error $$E_p = \frac{1}{2}\sum_{j=1}^{m}(\hat{a}_{pj} - a_{pj})^2$$

in a pattern p. The following approach is based on the consideration that the calculation of the gradient for the total error function E can be carried out by summation of the gradients over all error functions $E_p$ of the individual training patterns, since the total error E is nothing more than the sum to be minimized $$E = \sum_{p=1}^{q}E_p = \frac{1}{2}\sum_{p=1}^{q}\sum_{j=1}^{m}(\hat{a}_{pj} - a_{pj})^2 = \min$$

of all q learning errors. Since the learning error E is decreasing, i.e., δE/δ$w_i$<0, the following has to apply for i=1, 2, . . . , n:

$$\Delta w_i = -\gamma\frac{\partial E}{\partial w_i} = -\gamma\sum_{p=i}^{q}\frac{\partial E_p}{\partial w_i},$$

wherein the proportionality factor y indicates the learning rate. The modification rule for all n connecting weights can accordingly be written as $$\Delta w = -\gamma\nabla E(w) =$$
$$-\gamma\left(\frac{\partial E}{\partial w_1}, \frac{\partial E}{\partial w_2}, \dots, \frac{\partial E}{\partial w_n}\right) = -\gamma\left(\sum_{p=1}^{q}\frac{\partial E_p}{\partial w_1}, \sum_{p=1}^{q}\frac{\partial E_p}{\partial w_2}, \dots, \sum_{p=1}^{q}\frac{\partial E_p}{\partial w_n}\right).$$

The change of the weight vector is therefore proportional to the negative gradient of the error function. The net input of the output neurons is calculated according to the linear standard propagation function as $$net_{pj} = \sum_{i=1}^{m}w_{ij}a_{pi},$$

wherein $w_{ij}$ is the weight between the transmitting neuron i and the receiving neuron j. The special feature of multilayer perceptrons is the use of a nonlinear sigmoid function $$a_{pj} = f(net_{pj}) = f\left(\sum_{i=1}^{m}w_{ij}a_{pi}\right) = \frac{1}{1 + e^{-net_{pi}}}$$

for activating the neurons. The error in the training pattern p over all output neurons thus has to become minimal after use of the activation function, i.e.

$$E_p = \frac{1}{2}\sum_{j=1}^{m}(\hat{a}_{pj} - a_{pj})^2 = \frac{1}{2}\sum_{j=1}^{m}\left(\hat{a}_{pj} - f\left(\sum_{i=1}^{m}w_{ij}a_{pi}\right)\right)^2 \to \min.$$

The learning problem may be approximately described verbally in that the connecting weights $w_{ij}$ are to be determined so that the square total error difference between target and actual output (wherein the latter represents a nonlinear function of the weighted net input) becomes minimal for all output neurons. The Euclidean distance between target vector and output vector is thus to be minimized. The required condition for solving the extreme value task has the consequence that the gradient of the error function has to become zero, i.e.

$$\nabla E(W) = \left(\frac{\partial E}{\partial w_{11}}, \frac{\partial E}{\partial w_{12}}, \dots, \frac{\partial E}{\partial_{mm}}\right) = 0.$$

In this case, the coefficients for all modifiable connecting weights can be represented more comprehensibly as a connection matrix $$W = \begin{pmatrix} w_{11} & \cdots & w_{1j} & \cdots & w_{1m} \\ \vdots & \ddots & \vdots & \ddots & \vdots \\ w_{i1} & \cdots & w_{ij} & \cdots & w_{im} \\ \vdots & \ddots & \vdots & \ddots & \vdots \\ w_{m1} & \cdots & w_{mj} & \cdots & w_{mm} \end{pmatrix}.$$

The gradient descent method is based on the concept of performing the change of the individual connecting weights proportionally to the negative gradient of the error function:

$$\frac{\partial E_p}{\partial w_{ij}} = \frac{1}{2}\sum_{i=1}^{m}\frac{\partial E_p}{\partial(\hat{a}_{pl} - a_{pl})}\frac{\partial}{\partial net_{pl}}(\hat{a}_{pl} - f(net_{pl}))\frac{\partial net_{pl}}{\partial w_{ij}} =$$

$$\sum_{i=1}^{m}\frac{\partial E_p}{\partial a_{pl}}\frac{\partial f(net_{pl})}{\partial net_{pl}}\frac{\partial net_{pl}}{\partial w_{ij}},$$

wherein the equation $$\frac{\partial E_p}{\partial (\hat{a}_{pl} - a_{pl})} = -\frac{\partial E_p}{\partial a_{pl}} = \hat{a}_{pl} - a_{pl}$$

was used. If the activation function were linear, any multi-layer back propagation network could thus be reduced to a two-stage network without concealed layer, since a linear propagation and activation function connected in series could be summarized as a single linear function.

The partial derivative of the above activation function required to fulfill the stated object reads $$\frac{\partial f(net_{pl})}{\partial net_{pl}} = \frac{e^{-net_{pl}}}{(1+e^{-net_{pl}})^2} = f^2(net_{pl})\left(\frac{1}{f(net_{pl})} - 1\right) = f(net_{pl})(1 - f(net_{pl})).$$

If the input to the ANN $$net_{pl} = \sum_{k=1}^{m} w_{kl} a_{pk}$$

is derived according to $w_{ij}$, the following is finally obtained $$\frac{\partial net_{pl}}{\partial w_{ij}} = \sum_{k=1}^{m} \frac{\partial}{\partial w_{ij}} w_{kl} a_{pk} \sum_{k=1}^{m} \frac{\partial w_{kl}}{\partial w_{ij}} \frac{\partial}{\partial w_{kl}} w_{kl} a_{pk}$$
$$= \sum_{k=1}^{m} \frac{\partial w_{kl}}{\partial w_{ij}} \frac{\partial}{\partial w_{kl}} \sum_{i=1}^{m} w_{kl} a_{pk} = \sum_{k=1}^{m} \frac{\partial w_{kl}}{\partial w_{ij}} \frac{\partial net_{pl}}{\partial w_{kl}}.$$

If all expressions obtained up to this point are inserted into the expression for the gradient of the above error function, at the end it reads $$\frac{\partial E_p}{\partial w_{ij}} = -\sum_{i=1}^{m} (\hat{a}_{pl} - a_{pl}) f(net_{pl})(1 - f(net_{pl})) \sum_{k=1}^{m} \frac{\partial w_{kl}}{\partial w_{ij}} \frac{\partial net_{pl}}{\partial w_{kl}}.$$

In summary, with $$\frac{\partial net_{pl}}{\partial w_{kl}} = a_{pk} \text{ and } \frac{\partial w_{kl}}{\partial w_{ij}} = 1,$$

and because i=k and j=l, the following expression results $$\frac{\partial E_p}{\partial w_{ij}} = -(\hat{a}_{pj} - a_{pj}) a_{pj} (1 - a_{pj}) a_{pi}.$$

Ultimately, the following is obtained as the weight adaptation $$\Delta w_{ij} = -\gamma \sum_{p=1}^{q} \frac{\partial E_p}{\partial w_{ij}} = \gamma \sum_{p=1}^{q} (\hat{a}_{pj} - a_{pj}) a_{pj} (1 - a_{pj}) a_{pi}.$$

The general considerations up to this point may now be transferred to a specific starting situation, which enables a step-by-step adaptation of the weights. The starting values $w_{ij}^0$ can be selected arbitrarily. With the corresponding network input $$net_{pj}^0 = \sum_{i=1}^{m} w_{ij}^0 a_{pi}$$

the zeroth output may be specified directly $$a_{pj}^0 = f\left(\sum_{i=1}^{m} w_{ij}^0 a_{pi}\right) = \frac{1}{1 + e^{-\sum_{i=1}^{m} w_{ij}^0 a_{pi}}}$$

and the zeroth weight adaptation reads $$\Delta w_{ij}^0 = \gamma \sum_{p=1}^{q} (\hat{a}_{pj} - a_{pj}^0) a_{pj}^0 (1 - a_{pj}^0) a_{pi}.$$

The connecting weights thus result in the next learning step from $$w_{ij}^1 = w_{ij}^0 + \Delta w_{ij}^0$$

and with $$a_{pj}^1 = f\left(\sum_{i=1}^{m} w_{ij}^1 a_{pi}\right) = \frac{1}{1 + e^{-\sum_{i=1}^{m} w_{ij}^0 a_{pi}}}$$

it follows as the first difference weight the following $$\Delta w_{ij}^1 = \gamma \sum_{p=1}^{q} (\hat{a}_{pj} - a_{pj}^0) a_{pj}^0 (1 - a_{pj}^0) a_{pi}.$$

The second approximation thus reads $$w_{ij}^2 = w_{ij}^1 + \Delta w_{ij}^1$$

and with $$a_{pj}^2 = f\left(\sum_{i=1}^{m} w_{ij}^1 a_{pi}\right) = \frac{1}{1 + e^{-\sum_{i=1}^{m} w_{ij}^0 a_{pi}}}$$

the second difference weight follows as $$\Delta w_{ij}^2 = \gamma \sum_{p=1}^{q} (\hat{a}_{pj} - a_{pj}^0) a_{pj}^0 (1 - a_{pj}^0) a_{pi}.$$

The third weight results similarly $$w_{ij}^3 = w_{ij}^2 + \Delta w_{ij}^2$$

In general, if $w_{ij}^n$ is known, an iterative sequence of the following variables applies $$net_{pj}^n = \sum_{i=1}^{m} w_{ij}^n a_{pi},$$

-continued $$a_{pj}^n = f(net_{pj}^n) = \frac{1}{1+e^{-net_{pj}^n}},$$

$$\Delta w_{ij}^n = \gamma \sum_{p=1}^{q} (\hat{a}_{pj} - a_{pj}^0) a_{pj}^n (1 - a_{pj}^n) a_{pi},$$

$$w_{ij}^{n+1} = w_{ij}^n + \Delta w_{ij}^n.$$

The application of neural networks is divided into two phases, a learning phase and an application phase. In the learning phase, a set of training faces is presented to the network, on the basis of which the connecting weights of the neurons are adjusted so that the network fulfills the desired behaviour and the difference between the output value and the desired target value is minimal. In the application phase, input vectors are again offered, wherein the output vectors are calculated independently with retrieval of the learned knowledge from the network.

Figure 7:
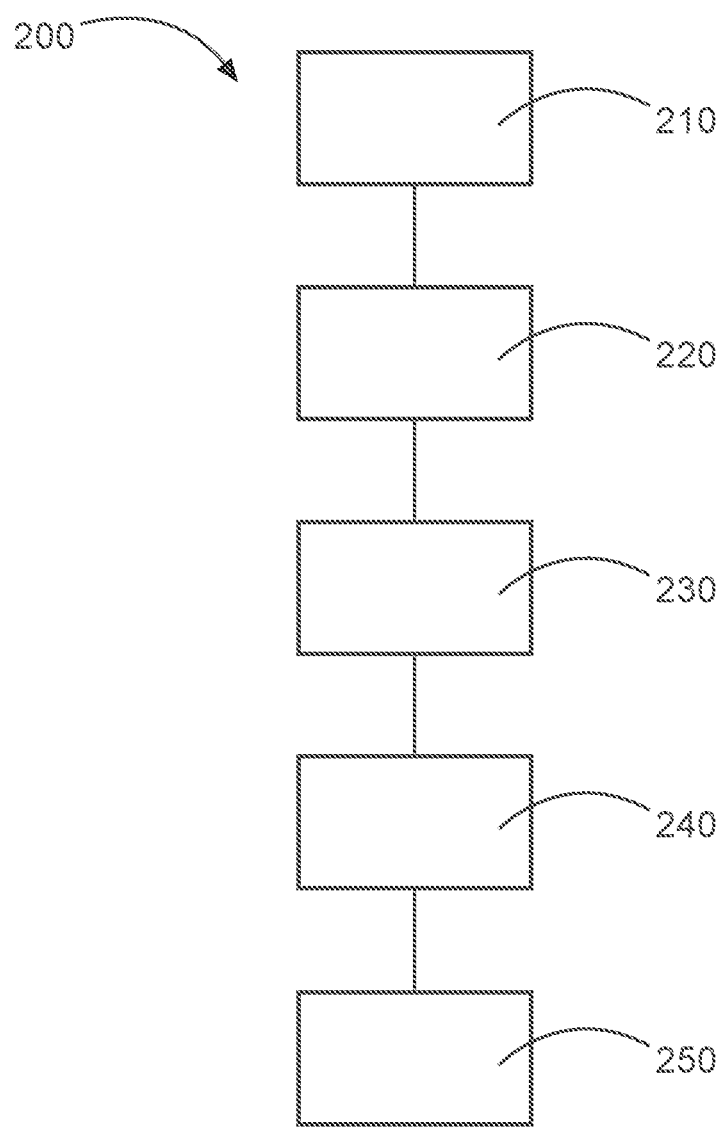
FIG. 7 shows a schematic illustration of a method for identifying objects using an artificial neural network.

FIG. 7 shows a method 200 for identifying objects using an artificial neural network ("ANN"). The method 200 comprises dividing (210) a two-dimensional image of an object to be identified into a plurality of triangles, which are delimited by characteristic points (151) of the object to be identified at their corners; ascertaining (220) a rotational angle of the object to be identified in the two-dimensional image based on symmetry properties of the object to be identified and relative area components of the individual triangles in a total sum of the area of the triangles; ascertaining (230) corrected areas of the triangles, in such that the areas of the triangles are multiplied by a correction factor, wherein the corrected areas of the triangles correspond to a symmetry condition; scaling (240) the corrected areas of the triangles to a rotation-invariant dimension of the object to be identified; and supplying (250) the scaled corrected areas to the ANN in order to perform a comparison of objects based thereon and to identify these objects.

In addition, it is to be noted that "comprising" or "including" does not exclude other elements or steps and "a" or "one" does not exclude a plurality. Furthermore, it is to be noted that features or steps which have been described with reference to one of the above exemplary embodiments can also be used in combination with other features or steps of other above-described exemplary embodiments. Reference numerals in the claims are not to be viewed as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 1 object identification unit
50 data source
60 output unit
70 data memory
80 control unit
100 artificial neural network
110 input layer
111-114 input neurons
120 intermediate layer
130 output layer
131-136 output neurons
150 two-dimensional image
151 characteristic points
152 vertical distances
155 vertical axis of symmetry
200 method
210-250 method steps

The invention claimed is:

1. An object identification unit for identifying objects, comprising:
an artificial neural network ("ANN") having an input layer and an output layer, wherein the ANN is configured to identify objects based on inputs at the input layer;
wherein the input layer comprises a plurality of input neurons;
wherein the input layer is configured to obtain an input vector, wherein the input vector contains items of object identification information on the object to be identified;
wherein the ANN is configured to identify an object that is symmetrical with respect to an axis of symmetry based on the items of object identification information;
wherein the items of object identification information correspond to a two-dimensional image of the object to be identified;
wherein the object identification unit is configured to divide the two-dimensional image into a plurality of triangles delimited by characteristic points of the object to be identified at their corners;
wherein the object identification unit is configured to ascertain a rotational angle of the object to be identified in the two-dimensional image from symmetry properties of the object to be identified and relative area components of the individual triangles in the total sum of the area of the triangles and to multiply the areas of the individual triangles by a correction factor to obtain corrected areas of the triangles, which correspond to a symmetry condition, wherein the symmetry condition is an axial symmetry with respect to the axis of symmetry with respect to an axis of the object to be identified, and wherein the symmetry condition is met when triangles in two halves of the object to be identified and defined by characteristic points corresponding to one another are of equal size;
wherein the object identification unit is configured to scale the corrected areas of the triangles to a rotation-invariant dimension of the object to be identified; and
wherein the object identification unit is configured to supply the scaled areas of the triangles to the ANN as the input vector.

2. The object identification unit according to claim 1, wherein the object to be identified is a human face.

3. The object identification unit according to claim 1, wherein the rotation-invariant dimension is a vertical or horizontal distance between two characteristic points of the object to be identified.

4. The object identification unit according to claim 1,
wherein the object identification unit is configured to be trained in a training phase using a plurality of images of objects, and
wherein the images show the objects without rotational angles.

5. The object identification unit according to claim 1, wherein the object identification unit is configured to divide the two-dimensional image into a plurality of triangles so that at least some of the triangles are symmetrical to an axis of the object to be identified.

6. The object identification unit according to claim 1, wherein the object identification unit is configured to ascertain the correction factor such that a dimension ratio is ascertained for each pair of triangles consisting of two triangles corresponding to one another.

7. A method for identifying objects that are symmetrical with respect to an axis of symmetry using an artificial neural network ("ANN") wherein the method comprises:
dividing a two-dimensional image of an object to be identified into a plurality of triangles delimited by characteristic points of the object to be identified at their corners;
ascertaining a rotational angle of the object to be identified in the two-dimensional image based on symmetry properties of the object to be identified and relative area components of the individual triangles in a total sum of the area of the triangles;
ascertaining corrected areas of the triangles, such that the areas of the triangles are multiplied by a correction factor, wherein the corrected areas of the triangles correspond to a symmetry condition wherein the symmetry condition is an axial symmetry with respect to an axis of the object to be identified, and wherein the symmetry condition is met when triangles in two halves of the object to be identified and defined by characteristic points corresponding to one another are of equal size;
scaling the corrected areas of the triangles to a rotation-invariant dimension of the object to be identified; and
supplying the scaled corrected areas to the ANN in order to perform a comparison of objects based thereon and to identify these objects.

8. The method according to claim 7, wherein the rotation-invariant dimension is a vertical or horizontal distance between two characteristic points of the object to be identified.

* * * * *